Patented May 2, 1950

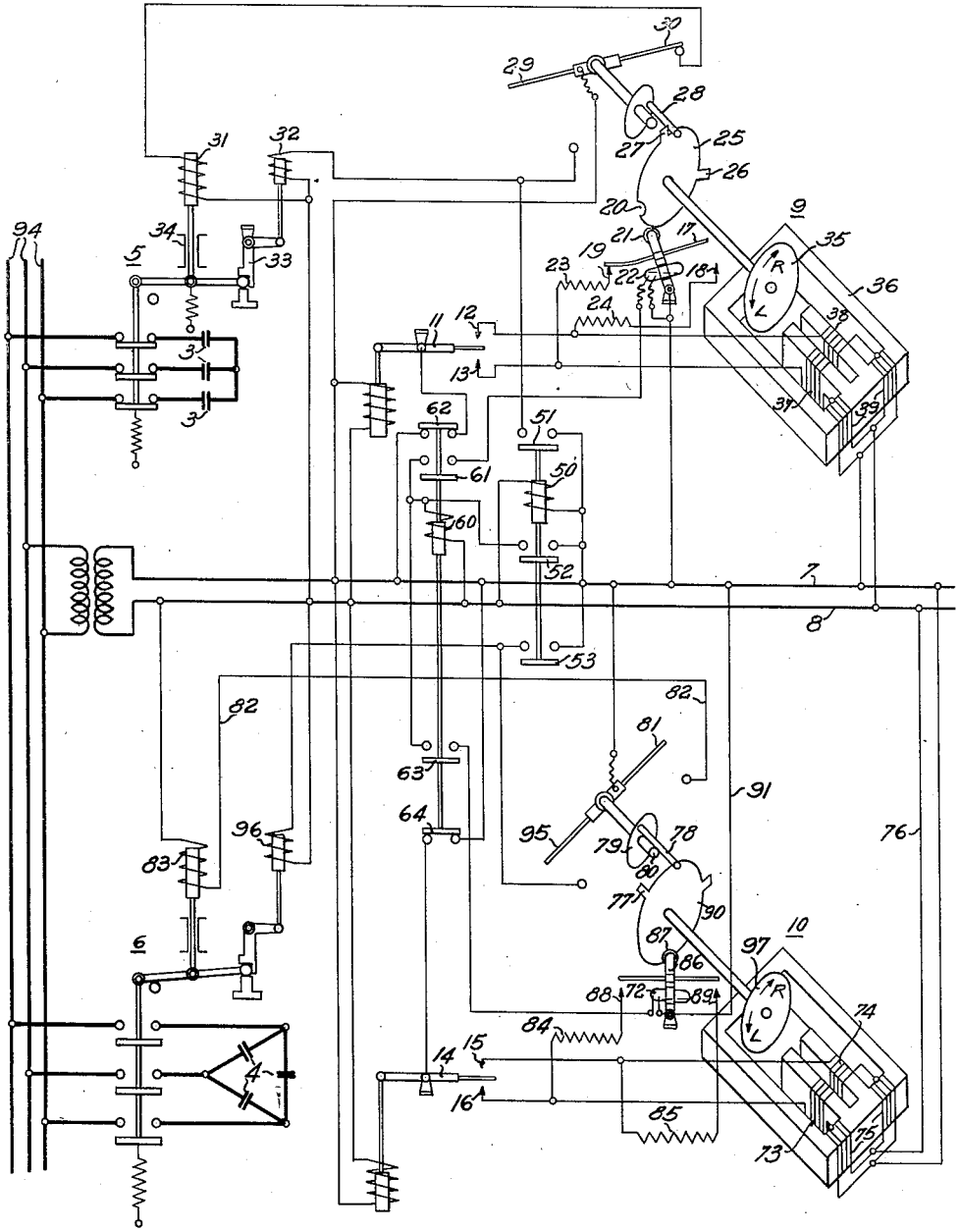

2,506,282

UNITED STATES PATENT OFFICE 2,506,282

DELAYED VOLTAGE CONTROL SYSTEM WITH INSTANTANEOUS OVERVOLTAGE PROTECTION

Thomas G. A. Sillers, Wauwatosa, Wis., assignor to Allis-Chalmers Manufacturing Company, Milwaukee, Wis., a corporation of Delaware Application November 9, 1945, Serial No. 627,724

7 Claims. (Cl. 323—106)

This invention relates in general to control systems and relates particularly to a control system for regulating an electrical characteristic of a circuit.

In prior art voltage control systems, the voltage of a line has been regulated by means for changing taps on a tapped transformer, by means for changing the relative positioning of the windings of an induction regulator, by means for switching capacitors on and off of a line, and by the use of similar regulating devices. Generally, such regulation has been accomplished by operation of a voltage responsive relay, acting with a substantial time delay to initiate a regulating step to increase or decrease the voltage. If an abnormally high voltage should occur on the line, only for a period less than the time delay for which such voltage responsive relays are set, it is desirable that the line voltage be reduced immediately in order to prevent damage to apparatus connected to the line.

It is therefore an object of the present invention to provide an improved control system for regulating an electrical characteristic of a circuit in which time delayed operation of the control system is avoided upon occurrence of abnormal circuit conditions.

It is also an object of the present invention to provide an improved regulating system involving a plurality of regulating devices which function with varying time delays, with a control responsive to abnormal circuit conditions, that will return the timing mechanisms of the regulating devices to their neutral positions.

Objects and advantages other than those above set forth will be apparent from the following description when read in connection with the drawing in which the single figure shows a diagrammatic illustration of a control system embodying the present invention.

In the drawing, the invention is illustrated by a control system for regulating the voltage of an alternating current line. The regulating means for effecting this regulation comprises a bank of capacitors 3, a circuit breaker 5, a closing coil 31, a trip coil 32, and a latch 33. Regulation is accomplished by the connection or disconnection of the bank of capacitors 3 to or from the line 94 by the circuit breaker 5, the action of which is controlled by the closing coil 31, the trip coil 32 and the latch 33, as hereinafter described. A second regulating means comprises a bank of capacitors 4, a circuit breaker 6, a closing coil 83, and a trip coil 96 and operates in a manner similar to the above mentioned regulating means.

The banks of capacitors 3 and 4 may be connected to the line 94 in any suitable manner, the capacitors 3 being shown as connected in Y and the capacitors 4 being shown as connected in delta, however, the particular circuit formed when the capacitors are connected by the circuit breakers 5 and 6 is incidental to the present invention.

The circuit breakers 5 and 6 are controlled by the actuation of time-delay devices 9 and 10, which are operatively responsive to operation of voltage responsive relays 11 and 14. The time-delay devices 9 and 10 are similar in construction and operation except that they are usually adjusted for different delay in their operation. The contact making voltmeters 11 and 14 operate in accordance with the voltage of a circuit 7, 8 which measures the voltage of line 94.

The time-delay devices 9 and 10 may be of the type shown in Joseph Bronaugh Re. 22,224, (original U. S. 2,280,766), November 24, 1942, Control system, and comprise generally a reversible motor having a core 36, a main winding 39, field windings 37 and 38 and a rotatable armature 35. Field winding 38, lug 27 of disk 25 and contact 30 define a first time-delay element, and field winding 37, lug 26 of disk 25 and contact 29 define a second time-delay element. The time-delay devices 9 and 10, hereinafter referred to as timers, are normally in the neutral position when the line voltage is at the desired value, and these timers are so controlled that after operation thereof the armature shaft returns to such neutral position. The timer 10 is shown in the neutral position and the timer 9 is shown in the position to which it had been operated to raise the voltage and in which it is being returned to the neutral position.

The timers 9 and 10 control the circuit breakers 5 and 6 to connect and disconnect the capacitors 3 and 4 from the line. The circuit breaker 5 for example has a closing coil 31 which may be energized through a switch 30 of the timer 9 to move the circuit breaker 5 into the closed position shown in the drawing. A trip coil 32 may be energized either through switch 29 of the timer 9 or through a contact 51 of the relay 50 to move a latch 33 in a counterclockwise direction about its pivot, to trip the circuit breaker 5, thereby disconnecting the capacitors 3 from the line. Circuit breaker 6 may be similarly operated by energization of its coils 83 and 96 through switches 81 or 95 of the timer 10 or contact 53 of relay 50.

Instantaneous means comprising over voltage relays 59 and 60 are provided for immediate disconnection of the capacitors 3 or 4 from the line in the event of a substantial over voltage. Relay 50 has its winding connected directly across the circuit 7, 8 and upon a predetermined abnormal voltage, relay 50 will immediately pick up, closing its contacts 51 and 53 to energize the trip coils of circuit breakers 5 and 6. These circuit breakers will be immediately opened, if they are in the closed position. An additional contact 52 on relay 50 closes to pick up relay 60 which seals itself in through a contact 61 or 63 on relay 60 and through switches 22 or 72 if closed. The switches 22 and 72 are closed only when the timers 9 or 10 have been operated in a direction to raise the voltage of line 11, that is, to the position in which the timer 9 is shown in the drawing. Normally closed contacts 62 and 64 on the relay 60 are opened when the relay picks up to prevent energization of the initiating circuit for operation of the timers 9 and 10 through contacts 12, 13, 15 or 16 of the contact making voltmeters 11 or 14. The timers 9 and 10 are, therefore, returned to their neutral positions before a further regulating operation may take place, as will be further described.

To simplify the description, the operation of timer 10 is described independently of its correlation with timer 9. If the voltage across the circuit 7, 8 drops below a predetermined value, the effect of the coil of the contact making voltmeter 14 will be overcome by the force of gravity acting on the core, or other bias action, thereby causing closure of contact 15. Closure of contact 15 closes a circuit from line 7 through contact 64 of relay 60, through contact 15 of contact making voltmeter 14, field winding 74 of timer 10, a portion of the main winding 75, conductor 76 to line 8. This energizes timer 10 to run its armature 97 in the R arrow direction and if such energization is continued for a predetermined time, a lug 77 on the disk 90 actuates a member 78 to rotate member 79 in a clockwise direction about its pivot 80, thereby closing contact 81. Closure of contact 81 closes a circuit from line 7 through contact 81, conductor 82, closing coil 83 of circuit breaker 6 to line 8, thereby energizing coil 83 to close the circuit breaker 6 to connect the capacitors 4 to the line 11 to raise the voltage thereof.

When the armature 97 of the timer 10 moves in the R arrow direction from its neutral position, a switch member 86 is actuated by means of a notch 87 in the disk 90 so as to close contact 88. Closure of contact 88 closes a circuit from line 7 through conductor 91, switch member 86, contact 88, resistance 84, field winding 73, a portion of winding 75, conductor 76 to the line 8. Thus the timer 10, while operating its armature 97 in the R arrow direction as previously described, is at the same time energized at a reduced energization which tends to run the armature 97 in the L arrow direction to return the timer to neutral position. After the capacitors 4 have been switched into the circuit, and if the voltage of the line then returns to the normal desired value, contact 15 of contact making voltmeter 14 will open and the above traced reduced energization circuit through resistance 84 will return the armature 97 to neutral position. When the armature 97 returns to neutral position, the switch 86 is operated by the notch 87 to open contact 88, thereby deenergizing timer 10.

To consider the timer operation following a rise in voltage above a predetermined value, the operation of timer 9 from the position shown in the drawing is considered without correlation in the system. If the voltage on lines 7, 8 rises to a predetermined value, contact making voltmeter 11 will close its contact 13 to run the timer 9 in the L arrow direction. After a predetermined delay (which may be different than the delay utilized upon a drop in voltage) lug 26 on the disk 25 will actuate the member 28 to close contact 29 energizing trip coil 32 to trip the latch 33, permitting the bias action of the springs to open the circuit breaker 5. This action disconnects the capacitors 3 from the line, and if the voltage drops to the desired normal value, the timer 9 returns to its neutral position in a manner similar to that described for timer 10.

The timers 9 and 10 are shown as being of the type known as integrating timers. For example, if a voltage above a predetermined normal value appears on the line 7, 8, both contact making voltmeters 11 and 14, if set for the same voltage, will close their appropriate contacts and the timers 9 and 10 will start to rotate their respective armatures in the L arrow direction. However, if the timers have rotated for only a portion of the time for which they are set before the voltage on line 7, 8 returns to normal, the contact making voltmeters 11 and 14 will open their closed contacts and the timers 9 and 10 will start to return to their neutral positions. If, prior to the return of timers 9 and 10 to neutral, the voltage of line 7, 8 again rises above normal, the timers 9 and 10 will again operate to rotate their armatures further in the L arrow direction. The timers 9 and 10 will therefore integrate the periods during which the voltage of the line 7, 8 is above (or is below) the normal desired value for which they are set, and if such voltage is above such value a greater time than it is below, a regulating action will occur although the over voltage has not been maintained at any one time for the full time setting of the timers.

The line 94 may be many miles long and the plurality of groups of capacitors may be spaced therealong at intervals of several miles, and the normal desired voltage could be slightly different at such locations. In such event each timer would, for the sake of convenience and expense, have separate relays 50 and 60 for each timer. The groups of capacitors might have their accompanying timers set for time delays such as 30, 60, 90, 120 and 150 seconds, respectively, the banks of capacitors being connected into or disconnected from the circuit one after the other as would be necessary to change the voltage to maintain the normal desired value.

With the timers set for operation with different timing, and due to the integrating feature of the timers, it is possible that two or more banks of capacitors could be connected when the voltage on the line 7, 8 had dropped to a value necessitating only one bank of capacitors being connected to the line. Connection of two banks of capacitors when only one is necessary, might cause an over voltage of as much as 15% which would be dangerous to the load elements connected to the line 11. Unless prevented, two such banks of capacitors could be disconnected from the line by the relay 50 only to be reconnected due to action of the contact making voltmeters, and the voltage would oscillate back and forth as the capacitors were connected in and disconnected from the circuit.

The above undesirable operation is prevented in the present control system in that the over voltage relays 50 and 60 not only disconnect both banks of capacitors, if connected to the line, but these relays also return both timers to neutral position before control thereof is regained by the contact making voltmeters. Upon the contact making voltmeters regaining control, only one bank of capacitors will be reconnected due to the difference in timing and due to the fact that the timers will have started from a neutral position.

In the control system illustrated, the contact making voltmeters 11 and 14 are, for the sake of convenience in explanation, shown as connected to the same points on line 7, 8. The various contact making voltmeters, usually one for each group of capacitors, may be connected as shown, or may be separately connected to the line 94 at spaced intervals of several miles. The timers, such as illustrated by 9 and 10, may have different time delays and these delays may be different when a raise in voltage is called for by the voltage responsive relays 11 or 14, than when a drop in voltage is called for.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a control system for controlling the voltage of a circuit by the connection to said circuit and the disconnection from said circuit of one or more of a plurality of groups of capacitors by means of a plurality of circuit breakers, the combination of a first means for causing connection to or disconnection from said line of one of said groups of capacitors by means of one of said circuit breakers after existence on said line for a predetermined period of a predetermined change in voltage from a normal desired value, a second means for causing connection to or disconnection from said line of another of said groups of capacitors by means of another of said circuit breakers after existence on said line for another predetermined period of another predetermined change in voltage from a normal desired value, and means responsive to an abnormal voltage rise on said line for immediately opening any of said circuit breakers that are in closed position, said last mentioned means further providing for further operation of said first and said second means only after delays of said predetermined periods.

2. In a control system for regulating the voltage of a circuit, regulating means for returning said voltage to a normal desired value thereof, a relay responsive to a predetermined change in said voltage from said normal desired value, a time-delay device responsive to operation of said relay for initiating operation of said regulating means after a predetermined delay, and instantaneous means for initiating operation of said regulating means and for returning said time-delay device to the position thereof for initiating said predetermined delay, said instantaneous means being responsive only to a change in said voltage substantially greater than said predetermined change.

3. In a control system for regulating the voltage of a circuit, regulating means for returning said voltage to a normal desired value thereof, a relay responsive to a predetermined change in said voltage from said normal desired value, a time-delay device responsive to operation of said relay for initiating operation of said regulating means after a predetermined delay, and instantaneous means for initiating operation of said regulating means and for returning said time-delay device to the position thereof for initiating said predetermined delay, said instantaneous means being responsive only to a rise in said voltage to a value substantially greater than the value attained upon said predetermined change.

4. In a control system for regulating the voltage of a circuit, a plurality of regulating means for returning said voltage to a normal desired range of values thereof, a plurality of relays responsive to predetermined changes in said voltage from said normal desired range of values, a plurality of time-delay devices one of which is responsive to operation of one of said relays for initiating operation of one of said regulating means after a predetermined delay and another of which is responsive to operation of another of said relays for initiating operation of another of said regulating means after a second predetermined delay, and instantaneous means for initiating operation of said plurality of regulating means, said instantaneous means being responsive only to a rise in said voltage to a value substantially greater than any value attained upon said predetermined changes.

5. In a control system for regulating the voltage of a circuit, a plurality of regulating means for returning said voltage to a normal desired range of values thereof, a plurality of relays responsive to predetermined changes in said voltage from said normal desired range of values, a plurality of time-delay devices one of which is responsive to operation of one of said relays for initiating operation of one of said regulating means after a predetermined delay and another of which is responsive to operation of another of said relays for initiating operation of another of said regulating means after a second predetermined delay, and instantaneous means for initiating operation of said plurality of regulating means and for returning said time-delay devices to the positions thereof for initiating said predetermined delays, said instantaneous means being responsive only to a rise in said voltage to a value substantially greater than any value attained upon said predetermined changes.

6. In a control system for regulating the voltage of a circuit, the combination of regulating means for returning said voltage to a normal desired value thereof, a time-delay device comprising first and second time-delay elements, a voltage relay responsive to predetermined changes in said voltage from said normal desired value, said relay being operable to energize said first time-delay element in response to a predetermined decrease in said voltage below said normal desired value thereof and operable to energize said second time-delay element in response to a predetermined increase in said voltage above said normal desired value thereof, said first and said second time-delay elements being operable to initiate operation of said regulating means after a predetermined time delay, first relay means responsive only to a change in said voltage substantially greater than said predetermined change for substantially instantaneously initiating operation of said regulating means, and second relay means energized by operation of said first relay means for rendering said voltage relay ineffective to energize said time-delay elements and for returning said time-delay elements to the position thereof for initiating said predetermined delay.

7. In a control system for regulating the voltage of a circuit, the combination of regulating means for returning said voltage to a normal desired value thereof, a time-delay device comprising first and second time-delay elements, a voltage-relay responsive to predetermined changes in said voltage from said normal desired value, said relay being operable to energize said first time-delay element in response to a predetermined decrease in said voltage below said normal desired value thereof and operable to energize said second time-delay element in response to a predetermined increase in said voltage above said normal desired value thereof, said first and said second time-delay elements being operable to initiate operation of said regulating means after a predetermined time delay, first relay means responsive only to a rise in said voltage substantially greater than said predetermined increase for substantially instantaneously initiating operation of said regulating means, and second relay means energized by operation of said first relay means for rendering said voltage relay ineffective to energize said time-delay elements and for returning said time-delay elements to the position thereof for initiating said predetermined delay.

THOMAS G. A. SILLERS.

REFERENCES CITED

The following references are of record in the file of this patent:

UNITED STATES PATENTS

| Number | Name | Date |
| --- | --- | --- |
| 1,738,344 | Anderson | Dec. 3, 1929 |
| 2,390,322 | Parr | Dec. 4, 1945 |